United States Patent
Stauffer et al.

(10) Patent No.: US 11,388,763 B2
(45) Date of Patent: Jul. 12, 2022

(54) FIFTH GENERATION NEW RADIO BACKHAUL AND ACCESS

(71) Applicant: Google LLC, Mountain View, CA (US)

(72) Inventors: Erik Richard Stauffer, Sunnyvale, CA (US); Jibing Wang, San Jose, CA (US)

(73) Assignee: Google LLC, Mountain View, CA (US)

(*) Notice: Subject to any disclaimer, the term of this patent is extended or adjusted under 35 U.S.C. 154(b) by 33 days.

(21) Appl. No.: 17/058,393

(22) PCT Filed: Jun. 24, 2019

(86) PCT No.: PCT/US2019/038681
§ 371 (c)(1),
(2) Date: Nov. 24, 2020

(87) PCT Pub. No.: WO2020/013979
PCT Pub. Date: Jan. 16, 2020

(65) Prior Publication Data
US 2021/0235520 A1   Jul. 29, 2021

Related U.S. Application Data

(63) Continuation of application No. 16/030,345, filed on Jul. 9, 2018, now Pat. No. 10,694,559.

(51) Int. Cl.
*H04W 12/06* (2021.01)
*H04W 24/02* (2009.01)
*H04W 36/00* (2009.01)
*H04W 36/24* (2009.01)
*H04W 48/20* (2009.01)
(Continued)

(52) U.S. Cl.
CPC ........... *H04W 76/12* (2018.02); *H04W 24/08* (2013.01); *H04W 48/08* (2013.01); *H04W 76/22* (2018.02); *H04W 84/042* (2013.01); *H04W 92/20* (2013.01)

(58) Field of Classification Search
CPC ..... H04W 76/12; H04W 76/22; H04W 24/08; H04W 48/08; H04W 84/042; H04W 92/20
See application file for complete search history.

(56) References Cited

U.S. PATENT DOCUMENTS 6,665,521 B1   12/2003  Gorday et al.
2016/0269910 A1   9/2016  Lindqvist et al.
(Continued)

FOREIGN PATENT DOCUMENTS

EP          2984870        2/2016
WO        2020013979       1/2020
WO    WO-2021220937 A1 *  11/2021

OTHER PUBLICATIONS

"Foreign Office Action", EP Application No. 19737634.6, dated Aug. 16, 2021, 3 pages.
(Continued)

*Primary Examiner* — Melvin C Marcelo
(74) *Attorney, Agent, or Firm* — Colby Nipper PLLC (57) ABSTRACT

This document describes monitoring and managing wireless backhaul integrated with mobile access in fifth generation new radio (5G NR) wireless networks. The techniques described employ an Integrated Backhaul-Access and Mobility Function (IB-AMF) to enable authorization of a base station to access a 5G network through another base station. The techniques described also monitor channel conditions and traffic loads to manage backhaul links and facilitate handovers of base station backhaul connections between other base stations.

20 Claims, 7 Drawing Sheets

(51) Int. Cl.

| | | |
|---|---|---|
| *H04W 76/12* | (2018.01) | |
| *H04W 24/08* | (2009.01) | |
| *H04W 48/08* | (2009.01) | |
| *H04W 76/22* | (2018.01) | |
| *H04W 84/04* | (2009.01) | |
| *H04W 92/20* | (2009.01) | |

(56) References Cited

U.S. PATENT DOCUMENTS

| | | |
|---|---|---|
| 2017/0064731 A1 | 3/2017 | Wang et al. |
| 2018/0049190 A1 | 2/2018 | Abedini et al. |
| 2018/0076839 A1 | 3/2018 | Baghel et al. |
| 2018/0092139 A1 | 3/2018 | Novlan et al. |
| 2018/0184470 A1 | 6/2018 | Luo et al. |

OTHER PUBLICATIONS

"Consideration on IAB Physical Layer Enhancement", 3GPP TSG RAN WG1 Meeting #91, Reno, USA, Nov. 27-Dec. 1, 2017, 2017, 7 pages.

"Considerations on Startup Procedure for L2 IAB Architecture", 3GPP TSG-RAN WG3 #100, Busan, South Korea, May 21-25, 2018, May 2018, 4 pages.

"Forward Compatibility Design for NR Integrated Access and Backhaul", 3GPP TSG-RAN Working Group 3 Meeting #96, Reno, USA, 14/Nov. 18, 2016, 2016, 4 pages.

"International Search Report and Written Opinion", PCT Application No. PCT/US2019/038681, dated Sep. 9, 2019, 19 pages.

"Overview on RAN1 Related Issues in IAB", 3GPP TSG RAN WG1 #92bis, Apr. 16-20, 2018, Apr. 2018, 15 pages.

Addali, et al., "Dual-Backhaul Links in LTE-A Mobile Relay System For High-Speed Railways", Aug. 2016, 5 pages.

Slam, et al., "Investigation of Performance in Integrated Access and Backhaul Netwoks", Apr. 1, 2018, 6 pages.

Polese, et al., "End-to-End Simulation of Integrated Access and Backhaul at mmWaves", Aug. 1, 2018, 8 pages.

Teyeb, et al., "Integrated Access Backhauled Networks", Jun. 21, 2019, 5 pages.

"Foreign Office Action", IN Application No. 202047052275, dated Feb. 3, 2022, 5 pages.

* cited by examiner

FIFTH GENERATION NEW RADIO BACKHAUL AND ACCESS

BACKGROUND

The evolution of wireless communication to fifth generation (5G) standards and technologies provides higher data rates and greater capacity, with improved reliability and lower latency, which enhances mobile broadband services. 5G technologies also enable new classes of services for vehicular networking, fixed wireless broadband, and the Internet of Things (IoT).

A unified air interface, which utilizes licensed, unlicensed, and shared license radio spectrum in multiple frequency bands is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

The increased radio spectrum for 5G systems provides wider bandwidth for access by user devices and also provides sufficient bandwidth to support backhaul between 5G base stations. However, providing flexible access and backhaul creates new link management issues to configure and reconfigure wireless backhaul as channel conditions and traffic conditions change.

SUMMARY

This summary is provided to introduce simplified concepts of fifth generation new radio backhaul and access. The simplified concepts are further described below in the Detailed Description. This summary is not intended to identify essential features of the claimed subject matter nor is it intended for use in determining the scope of the claimed subject matter.

In some aspects, a method of managing wireless backhaul communications in a wireless communication network by an Integrated Backhaul Access and Mobility Function (IB-AMF) server is described, in which the IB-AMF server receives an access request from a base station, authenticates the base station for access to the wireless communication network, and allocates resources for a wireless backhaul link between the base station and a relay base station. The IB-AMF server sends an access grant to the relay base station that includes an indication of the allocated resources for the wireless backhaul link. Sending the access grant causes the relay base station to forward the access grant to the base station and establish the wireless backhaul link. By authenticating the base station for access to the wireless communication network, allocating resources, and sending an access grant to the relay base station, the IB-AMF server grants authorizations and access to the base station to connect to the wireless communication network wirelessly through the relay base station whilst providing flexible access and providing scalable backhaul capability to address varying network traffic loads.

In other aspects, an integrated backhaul access and mobility server device is described, which is comprises one or more processors and a memory comprising instructions for an Integrated Backhaul Access and Mobility Function (IB-AMF) application. The instructions are executable by the one or more processors to configure the one or more processors to receive an access request for access to a wireless communications network from a base station, authenticate the base station for access to the wireless communication network, allocate resources for a wireless backhaul link between the base station and a relay base station, and send an access grant to the relay base station. The access grant includes an indication of the allocated resources for the wireless backhaul link, and sending the access grant causes the relay base station to forward the access grant to the base station and establish the wireless backhaul link.

In further aspects, a system includes multiple relay base stations, a base station configured to backhaul user-plane and control-plane communications of a wireless communications network via one or more of the multiple relay base stations, and an Integrated Backhaul Access and Mobility Function (IB-AMF) server connected to the multiple relay base stations. The IB-AMF server receives monitoring data from the base station, a first relay base station, or both for a wireless backhaul link between the base station and the first relay base station and, based at least in part on the received monitoring data, determines to handover the wireless backhaul link from the first relay base station to a second relay base station. The IB-AMF server allocates resources for the wireless backhaul link between the base station and the second relay base station and transmits handover trigger messages to the base station, the first relay base station, and the second relay base station, the transmission being effective to cause the handover of the wireless backhaul link from the first relay base station to the second relay base station. Thus, by monitoring data from the base station and/or first relay base station and managing the handover, the IB-AMF sever provides a flexible way to configure and reconfigure wireless backhaul links as channel conditions and traffic conditions change in order to maintain reliable backhaul connections and load balance network traffic across the relay backhaul base stations.

In another aspect, a system includes multiple relay base stations, a base station configured to backhaul user-plane and control-plane communications of a wireless communications network via one or more of the multiple relay base stations, and an Integrated Backhaul Access and Mobility Function (IB-AMF) server connected to the multiple relay base stations. The IB-AMF server including means for receiving monitoring data from the base station, a first relay base station, or both for a wireless backhaul link between the base station and the first relay base station and, based at least in part on the received monitoring data, means for determining to handover the wireless backhaul link from the first relay base station to a second relay base station. The IB-AMF server includes means for allocating resources for the wireless backhaul link between the base station and the second relay base station and means for transmitting handover trigger messages to the base station, the first relay base station, and the second relay base station, the transmission being effective to cause the handover of the wireless backhaul link from the first relay base station to the second relay base station.

For the above aspects, the IB-AMF server or IB-AMF server device, is a server or server device configured to manage wireless backhaul communications in a network. For example, the IB-AMF server or IB-AMF server device may be a server or server device configured to manage control-plane functions for backhaul access (e.g., user-plane and control-plane communications between base stations and the core network and/or relay base stations). The control plane functions may include one or more of the following functions: authentication, authorization, access grants, monitoring and managing backhaul links, triggering and monitoring handovers of backhaul links or the like. The IB-AMF server or server device may be implemented in the core network.

BRIEF DESCRIPTION OF THE DRAWINGS

Aspects of fifth generation new radio backhaul and access are described with reference to the following drawings. The same numbers are used throughout the drawings to reference like features and components.

DETAILED DESCRIPTION

Overview

This document describes monitoring and managing wireless backhaul integrated with mobile access in fifth generation new radio (5G NR) wireless networks. Providing flexible access and backhaul creates new link management issues to configure and reconfigure wireless backhaul as channel conditions and traffic conditions change. The techniques described employ an Integrated Backhaul-Access and Mobility Function (IB-AMF) to enable authorization of a base station to access a 5G network through another base station. The techniques described also monitor channel conditions and traffic loads to manage backhaul links and facilitate handovers of base station backhaul connections between other base stations. The described techniques provide flexible access and backhaul communication links that provide scalable backhaul capability to address varying network traffic loads, including flexible ways to configure and reconfigure wireless backhaul as channel conditions and traffic conditions change to maintain reliable backhaul connections and/or backhaul capacity. The described techniques also enable load balancing of access and backhaul network traffic across the relay backhaul base stations and provide redundancy for backhaul traffic for base stations and access traffic of user devices.

In aspects, the Integrated Backhaul-Access and Mobility Function (IB-AMF) grants authorizations and access to a base station to connect through another base station (a relay base station) to a 5G NR network. For example, an access request from the base station is received by the relay base station, which forwards the access request to the IB-AMF. If the IB-AMF determines that the base station is authorized to join the 5G NR network, the IB-AMF authenticates the base station for access and sends an access grant to the base station and the relay base station. The access grant includes an indication of resources to be used for the wireless backhaul link between the base station and the relay base station.

Alternatively or optionally, the base station may have an existing connection to the 5G NR network, such as a wireline connection. The base station may need to establish the wireless backhaul link for additional capacity or a redundant connection to the 5G NR network. The base station can use this existing connection to send the access request to the IB-AMF and to receive the access grant from the IB-AMF.

In another aspect, the IB-AMF maintains an active backhaul link by monitoring link quality, throughput performance, and congestion levels of the backhaul link and of other base stations that can be used as relay base stations. The IB-AMF can determine an alternative relay base station for the wireless backhaul link based on the monitored parameters. The IB-AMF can trigger a handoff of the backhaul link from one relay base station to another relay base station based on the monitored parameters, such as poor link quality, link congestion, and the like. Alternatively or additionally, the IB-AMF can reduce the transmit power of a backhaul link or reduce the resources allocated for the backhaul link when utilization of the backhaul link decreases.

In a further aspect, multiple relay base stations can be configured to provide multiple-hop or mesh-networked backhaul links. The IB-AMF can make routing decisions to configure and control the multiple hops of a backhaul link based on monitored performance metrics of each link of the multiple-hop or mesh-networked backhaul links.

While features and concepts of the described systems and methods for fifth generation new radio backhaul and access can be implemented in any number of different environments, systems, devices, and/or various configurations, aspects of fifth generation new radio backhaul and access are described in the context of the following example devices, systems, and configurations.

Example Environment

Figure 1:
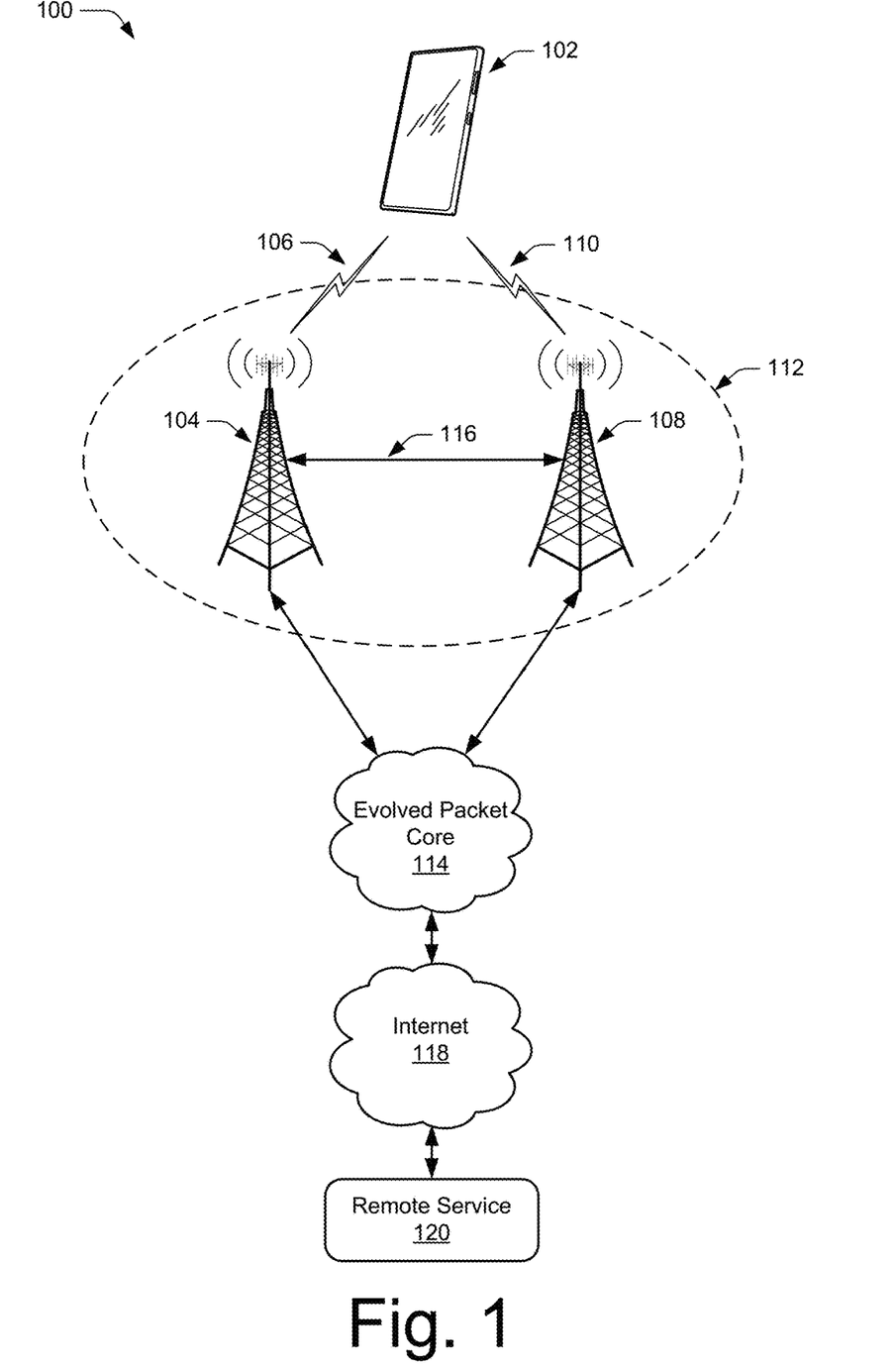
FIG. 1 illustrates an example wireless network environment in which various aspects of fifth generation new radio backhaul and access can be implemented.

FIG. 1 illustrates an example environment 100, which includes a user equipment 102 (user device 102) that communicates with a base station 104 through a wireless communication link 106 (wireless link 106). In this example, the user equipment 102 is implemented as a smartphone. Although illustrated as a smartphone, the user equipment 102 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 104 (e.g., an Evolved Universal Terrestrial Radio Access Network Node B, E-UTRAN Node B, evolved Node B, eNodeB, eNB, Next Generation Node B, gNode B, gNB, and the like) may be implemented in a macrocell, microcell, small cell, picocell, and the like, or any combination thereof.

The base station 104 communicates with the user equipment 102 via the wireless link 106, which may be implemented as any suitable type of wireless link. The wireless link 106 can include a downlink of data and control information communicated from the base station 104 to the user equipment 102, an uplink of other data and control information communicated from the user equipment 102 to the base station 104, or both. The wireless link 106 may include one or more wireless links or bearers implemented using any suitable communication protocol or standard, or combination of communication protocols or standards such as 3rd Generation Partnership Project Long-Term Evolution (3GPP LTE), 5GNR, and so forth. The wireless link 106 may be configured to support Time Division Duplex (TDD) communication, Frequency Division Duplex (FDD) communication, or both.

In aspects, the user equipment 102 communicates with another base station 104 (a neighbor base station 108), via a wireless link 110. The wireless link 110 may be implemented using the same communication protocol or standard, or a different communication protocol or standard, than the wireless link 106. For example, the wireless link 106 is a 5GNR link and the wireless link 110 is an LTE link. The base station 104, the neighbor base station 108, and any additional base stations (not illustrated for clarity) are collectively a Radio Access Network 112 (RAN 112, Evolved Universal Terrestrial Radio Access Network 112, E-UTRAN 112, 5G RAN 112), which are connected via an Evolved Packet Core 114 (EPC 114) network to form a wireless operator network. The base station 104 and the neighbor base station 108 can communicate using an Xn Application Protocol (XnAP), at 116, to exchange user-plane and control-plane data. The user equipment 102 may connect, via the EPC 114, to public networks, such as the Internet 118 to interact with a remote service 120.

Figure 2:
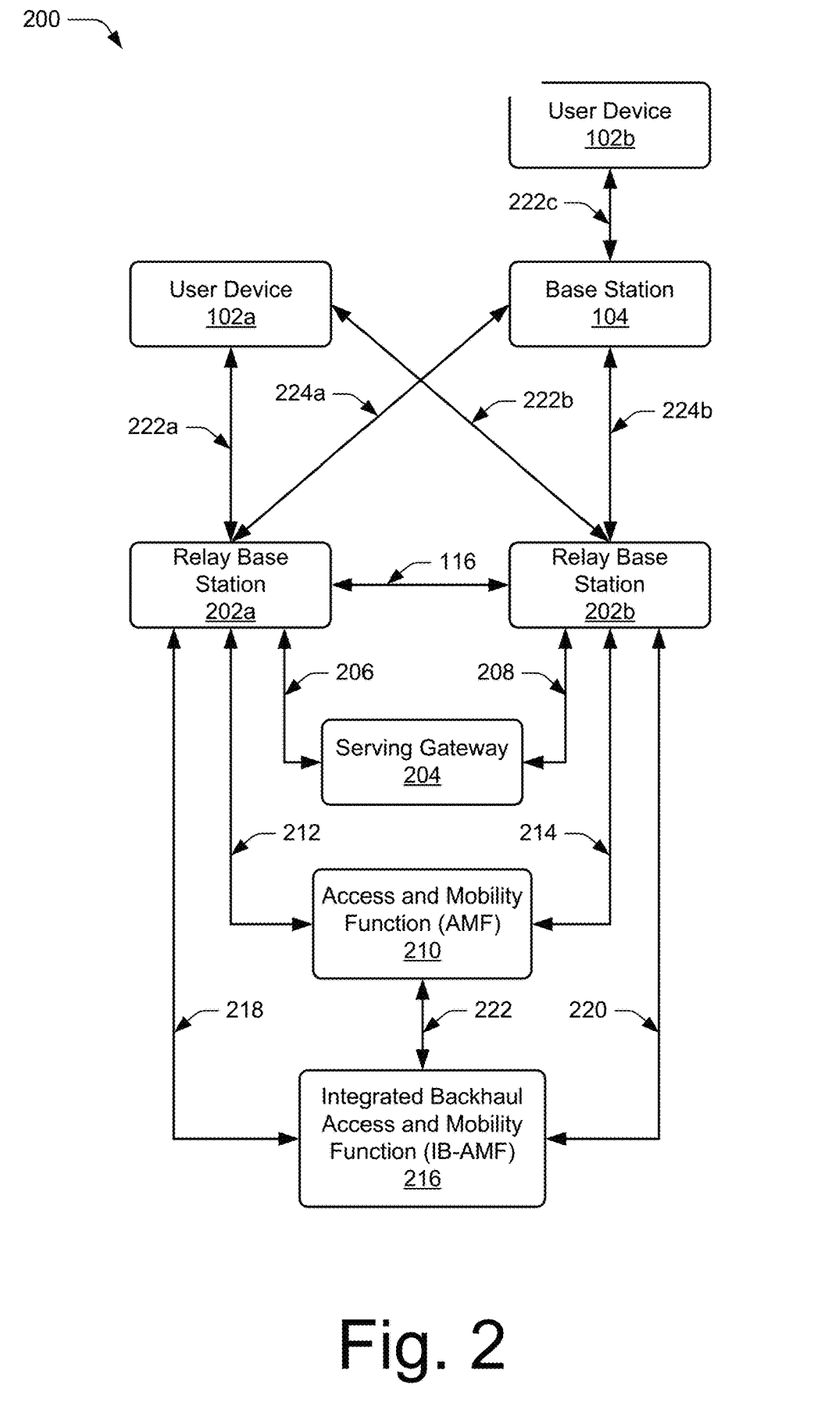
FIG. 2 illustrates an example environment in which various aspects of fifth generation new radio backhaul and access can be implemented.

FIG. 2 illustrates an example environment 200 in which various aspects of fifth generation new radio backhaul and access can be implemented. Two base stations 104 are illustrated as relay base stations 202 (202*a* and 202*b*). The relay base stations 202 include the capability to support access communication for user devices 102 to the RAN 112 and provide backhaul communication for other base stations 104. User-plane data flows to and from the relay base stations 202 via a serving gateway 204 in the evolved packet core 114, as shown at 206 and 208, respectively. The serving gateway 204 is connected to the Internet 118. For the sake of clarity of illustration, the EPC 114, and the connection of the serving gateway 204 to the Internet 118 are omitted from FIG. 2.

An Access and Mobility Function (AMF) 210 provides control-plane functions such as registration and authentication of user devices 102, authorization, mobility management, and the like. The AMF 210 communicates with the relay base stations 202, as shown at 212 and 214, respectively. The AMF 210 also communicates with the user devices 102 (102*a* and 102*b*), via the relay base stations 202, the base station 104, or both. The AMF 210 is part of the EPC 114.

Control-plane functions for backhaul access, such as authentication, authorization, access grants, monitoring and managing backhaul links, and triggering and monitoring handovers of backhaul links, and the like are managed by an Integrated Backhaul-Access and Mobility Function (IB-AMF) 216. Control-plane communications between the relay base stations 202 and the IB-AMF 216 are shown at 218 and 220. Optionally or additionally, when a user device 102 is handed off from one base station 104 to another, the AMF 210 can signal the IB-AMF 216, as shown at 222 to provide additional information about changes in traffic loads that may affect the utilization of wireless backhaul links.

The user devices 102*a* and 102*b* connect to the RAN 112 via a wireless communication link 106 to a base station 104. For example, the user device 102*a* is illustrated as connecting to the RAN 112 via the relay base station 202*a* at 222*a*, the relay base station 202*b* at 222*b*, or both relay base stations 202 such as when using carrier aggregation. The user device 102*b* is illustrated as connecting to the RAN 112 at 222*c* via the base station 104, which backhauls the traffic for the user device 102*b* via a wireless backhaul link to the relay base station 202*a* at 224*a*, the relay base station 202*b* at 224*b*, or both relay base stations 202. The wireless backhaul link may include one or more wireless links or bearers implemented using any suitable communication protocol or standard, or combination of communication protocols or standards such as 3rd Generation Partnership Project Long-Term Evolution (3GPP LTE), 5G NR, and so forth. The wireless backhaul link may be configured to support Time Division Duplex (TDD) communication, Frequency Division Duplex (FDD) communication, or both.

Example Devices

Figure 3:
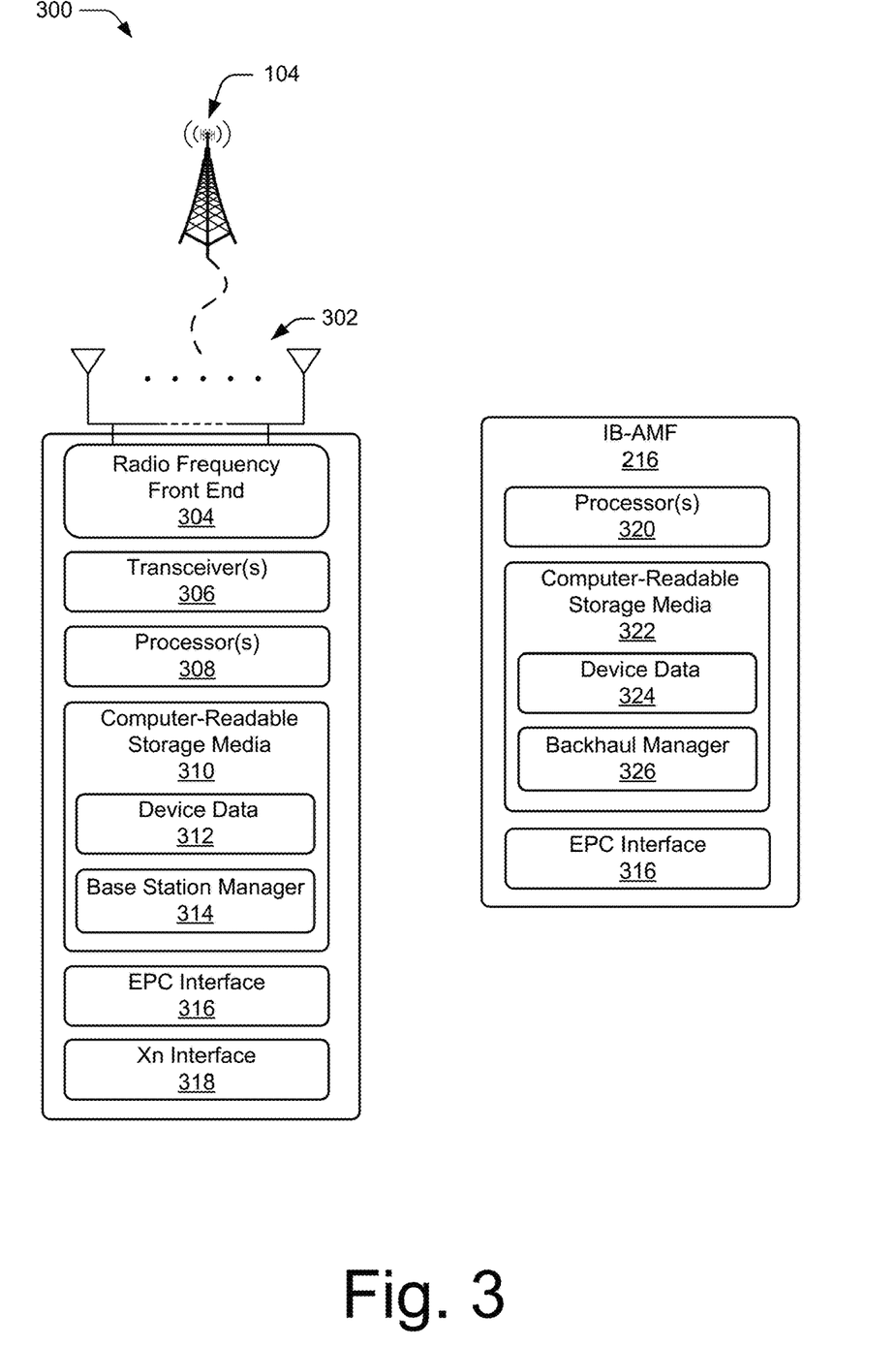
FIG. 3 illustrates an example device diagram for devices that can implement various aspects of fifth generation new radio backhaul and access.

FIG. 3 illustrates an example device diagram 300 of the base station 104 and the IB-AMF 216. It should be noted that only the features of the base station 104 and the IB-AMF 216 related to the techniques described herein are illustrated here. The base station 104 and the IB-AMF 216 may include additional features that are omitted from FIG. 3 for the sake of clarity.

The device diagram for the base station 104 (and relay base stations 202) shown in FIG. 3 includes a single network node (e.g., an E-UTRAN Node B or gNode B). The functionality of the base station 104 may be distributed across multiple network nodes and/or devices and may be distributed in any fashion suitable to perform the functions described herein. The base station 104 includes antennas 302, a radio frequency front end 304 (RF front end 304), one or more transceivers 306 that includes LTE transceivers, and/or 5G NR transceivers for communicating with the user equipment 102. The RF front end 304 of the base station 104 can couple or connect the transceivers 306 to the antennas 302 to facilitate various types of wireless communication. The antennas 302 of the base station 104 may include an array of multiple antennas that are configured similarly to or differently from each other. The antennas 302 and the RF front end 304 can be tuned to, and/or be tunable to, one or more frequency bands defined by the 3GPP LTE and 5G NR communication standards and implemented by the transceivers 306. Additionally, the antennas 302, the RF front end 304, and/or the transceivers 306 may be configured to support beamforming, such as Massive-MIMO, for the transmission and reception of communications with the user equipment 102.

The base station 104 also includes processor(s) 308 and computer-readable storage media 310 (CRM 310). The processor 308 may be a single core processor or a multiple core processor composed of a variety of materials, such as silicon, polysilicon, high-K dielectric, copper, and so on. CRM 310 may include any suitable memory or storage device such as random-access memory (RAM), static RAM (SRAM), dynamic RAM (DRAM), non-volatile RAM (NVRAM), read-only memory (ROM), or Flash memory useful to store device data 312 of the base station 104. The device data 312 includes network scheduling data, radio resource management data, applications, and/or an operating system of the base station 104, which are executable by processor(s) 308 to enable communication with the user equipment 102.

CRM 310 also includes a base station manager 314, which, in one implementation, is embodied on CRM 310 (as shown). Alternately or additionally, the base station manager 314 may be implemented in whole or part as hardware logic or circuitry integrated with or separate from other components of the base station 104. In at least some aspects, the base station manager 314 configures the transceivers 306 for communication with the user equipment 102, as well as communication with the EPC 114 via an EPC Interface 316. The base station 104 includes an Xn interface 318, which the base station manager 314 configures to exchange user-plane and control-plane data between the base station 104 and other base stations 104, to manage the communication of the base station 104 and/or other base stations 104 with the user equipment 102. The exchange of user-plane and control-plane data communicated via the Xn interface 318 may be carried over the wireless backhaul link between the base station 104 and a relay base station 202.

The IB-AMF 216 may be provided as a service in the core network (such as EPC 114), distributed across multiple servers (or server devices), or embodied on a dedicated server (or server device). For example, the IB-AMF 216 is illustrated as being embodied on a single server that includes processor(s) 320 and computer-readable storage media 322 (CRM 322). The processor 320 may be a single core processor or a multiple core processor composed of a variety of materials, such as silicon, polysilicon, high-K dielectric, copper, and so on. CRM 322 may include any suitable memory or storage device such as random-access memory (RAM), static RAM (SRAM), dynamic RAM (DRAM), non-volatile RAM (NVRAM), read-only memory (ROM), hard disk drives, or Flash memory useful to store device data 324 of the IB-AMF 216. The device data 324 includes configuration and/or authorization data and/or authentication data for base stations 104, and/or an operating system of the IB-AMF 216, which are executable by processor(s) 320 to enable communication with the base stations 104 (relay base stations 202) and the AMF 210. The IB-AMF 216 also includes the EPC interface 316 for communication with the AMF 210.

CRM 322 also includes a backhaul manager 326. Alternately or additionally, the backhaul manager 326 may be implemented in whole or part as hardware logic or circuitry integrated with or separate from other components of the IB-AMF 216. In at least some aspects, the backhaul manager 326 implements the IB-AMF 216 as an executable application that configures wireless backhaul communication between the base stations 104 and relay base stations 202.

Backhaul Configuration and Authorization

Figure 4:
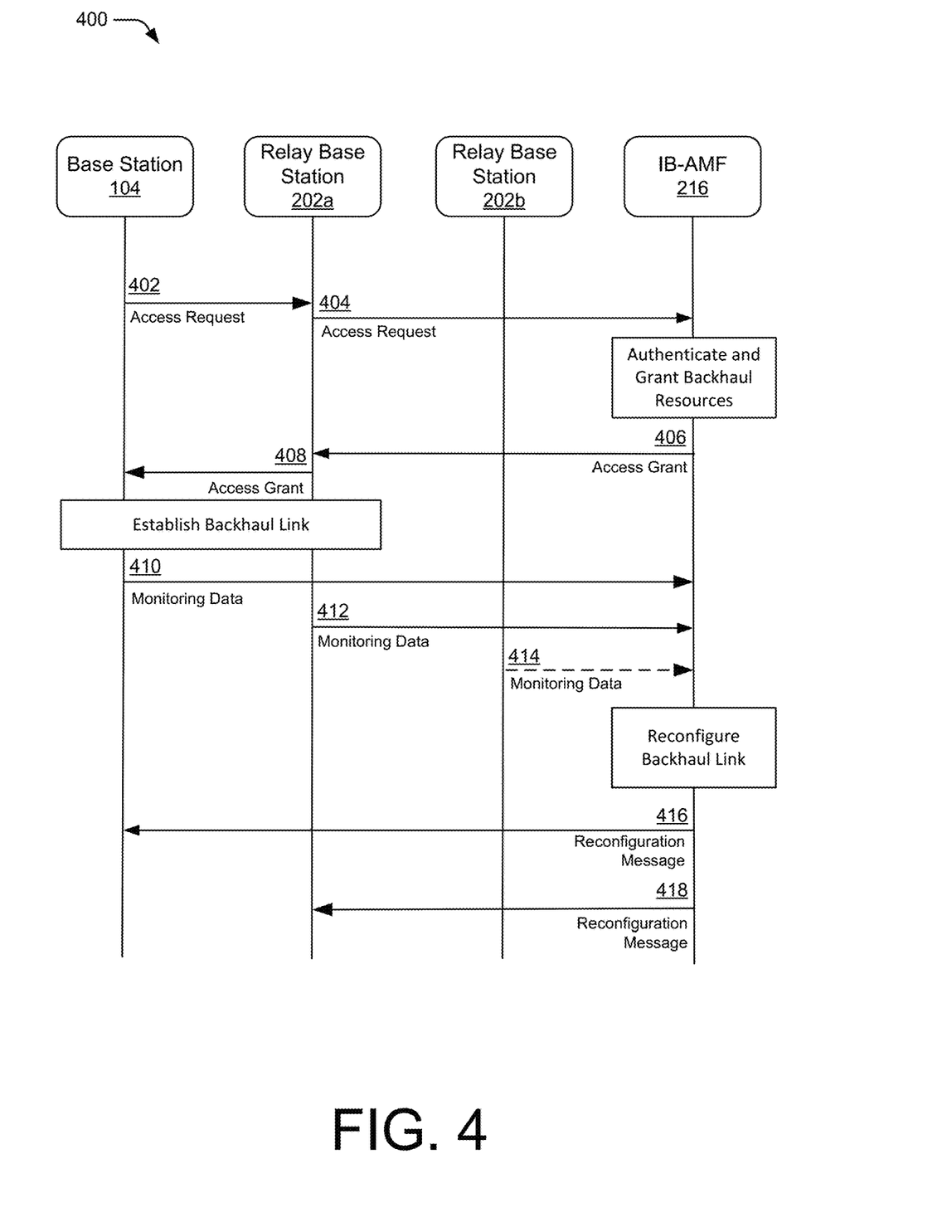
FIG. 4 illustrates details of example data and control transactions between devices in accordance with aspects of fifth generation new radio backhaul and access.

FIG. 4 illustrates details of example data and control transactions between devices in accordance with aspects of fifth generation new radio backhaul and access. In aspects, the IB-AMF 216, which may be implemented/executable on an IB-AMF server (or server device), grants authorizations and access to a base station 104 to connect through another base station (e.g., the relay base station 202a) to the 5G NR network. For example, the base station 104 sends an access request for a wireless backhaul link, at 402, via another base station (e.g., the relay base station 202a) that in turn forwards the access request to the IB-AMF 216, as shown at 404. The IB-AMF 216 authenticates the base station 104 and, if the base station 104 is allowed to access the 5G NR network, the IB-AMF 216 allocates resources for the backhaul link and includes an indication of the allocated resources in an access grant. The IB-AMF 216 sends the access grant to the relay base station 202a, which will provide the backhaul link for the base station 104, as shown at 406. The relay base station 202a forwards the access grant to the base station 104, at 408. The base station 104 and the relay base station 202a establish an active wireless backhaul link to carry control-plane and user-plane data using the resources indicated in the access grant.

In another aspect, the IB-AMF 216 actively maintains a backhaul link by monitoring link quality, throughput performance, and/or congestion levels of the backhaul link and of other base stations 104 that can be used as relay base stations 202. For example, the base station 104 and the relay base station 202a send monitoring data, at 410 and 412 respectively, to the IB-AMF 216. The monitoring data may include one or more of radio measurements of the backhaul link quality, radio measurements of the environment around the base station 104 or relay base station 202a, a traffic load on the backhaul link, data throughput on the backhaul link, data retransmission rates, the number of user devices 102 connected through the base station 104 or the relay base station 202a, or the like. Optionally or additionally, the IB-AMF 216 may also receive monitoring data, at 414, from one or more other relay base stations 202 (e.g., the relay base station 202b). Based on the received monitoring data, the IB-AMF 216 can reconfigure the backhaul link between the base station 104 and the relay base station 202a. The IB-AMF 216 sends reconfiguration messages to the base station 104 and the relay base station 212a, as shown at 416 and 418, respectively. The reconfiguration messages may increase or decrease resources allocated for the backhaul link, increase or decrease the transmit power used for the backhaul link, discontinue the wireless backhaul link, and so forth, based on increased or decreased utilization of the backhaul link.

Backhaul Mobility Management

Figure 5:
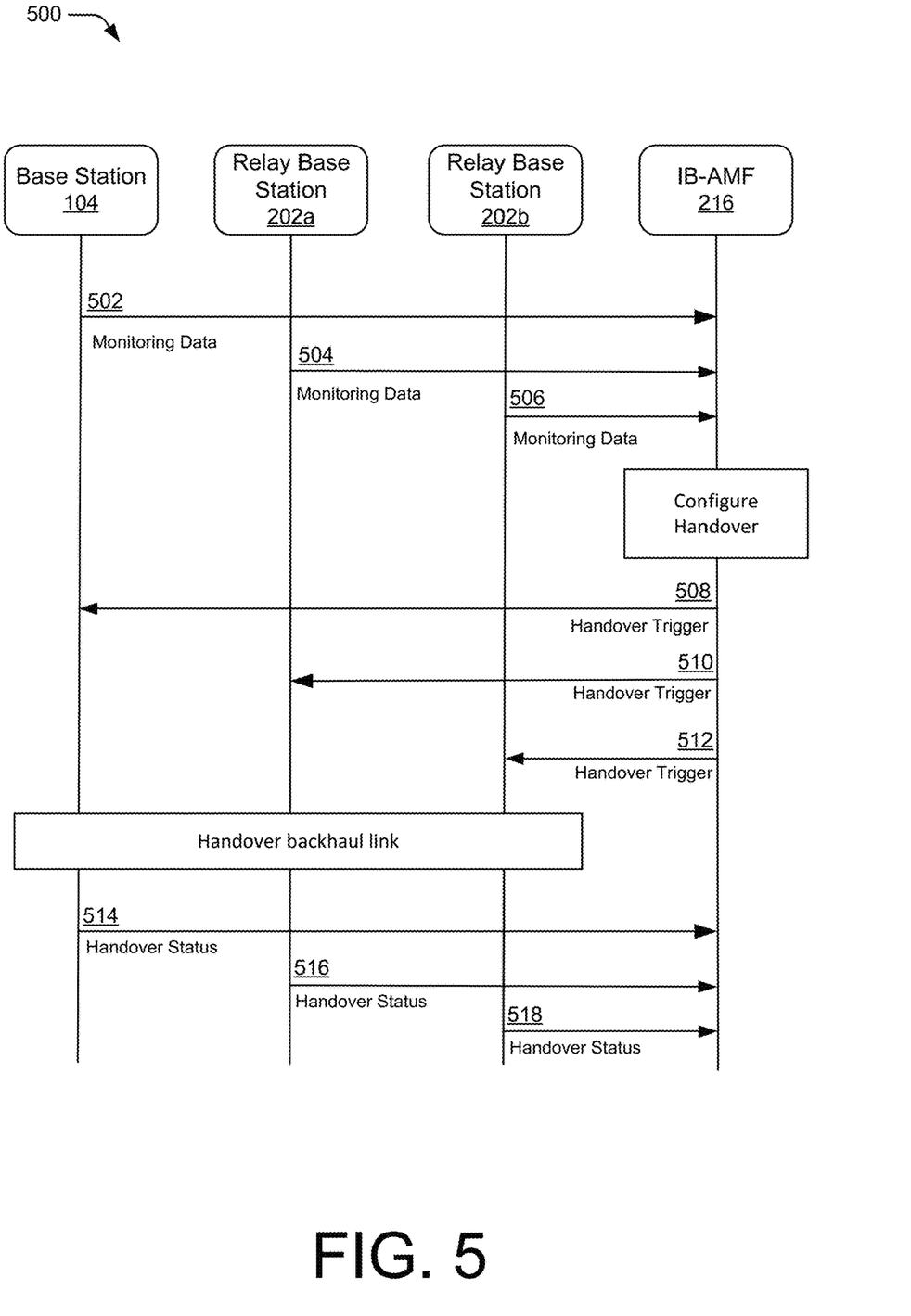
FIG. 5 illustrates details of example data and control transactions between devices engaged in a handover in accordance with aspects of fifth generation new radio backhaul and access.

FIG. 5 illustrates details of example data and control transactions between devices engaged in a handover in accordance with aspects of fifth generation new radio backhaul and access. In aspects, the IB-AMF 216 can determine an alternative relay base station 202 for a backhaul link based on monitoring data from the base station 104, the relay base station 202a, and a potential alternate relay base station 202b. The IB-AMF 216 can trigger and monitor a handoff of the backhaul link from one relay base station (e.g., the relay base station 202a) to another relay base station (e.g., the relay base station 202b) based on monitoring data, such as poor link quality, link congestion, and the like. Although a single candidate relay base station 202b is illustrated for the sake of clarity, the IB-AMF 216 may monitor and consider any number of candidate relay base stations 202 as candidates for a handover of the backhaul link. The IB-AMF 216 may also coordinate the handover based on information from the AMF 210 to consider any effects on user devices 102 connected to the base station 104 or relay base stations 202.

For example, the base station 104, and the relay base stations 202a and 202b send monitoring data, at 502, 504, and 506 respectively, to the IB-AMF 216. The IB-AMF 216 determines, based on the received monitoring data, to handover the backhaul link for the base station 104 from the relay base station 202a to the relay base station 202b. The IB-AMF 216 determines parameters for the handover, such as resource allocations for the backhaul link via the relay base station 202b, timing of the handover, and the like and includes the handover parameters in handover trigger messages that are sent to the base station 104, the relay base station 202a and the relay base station 202b, at 508, 510, and 512 respectively. The base station 104, the relay base station 202a and the relay base station 202b send handover status to the IB-AMF 216, as shown at 514, 516, and 518, respectively, to enable the IB-AMF 216 to monitor the progress and completion of the handover of the backhaul link.

Example Methods

Example methods 600 and 700 are described with reference to FIGS. 6 and 7 in accordance with one or more aspects of fifth generation new radio backhaul and access. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
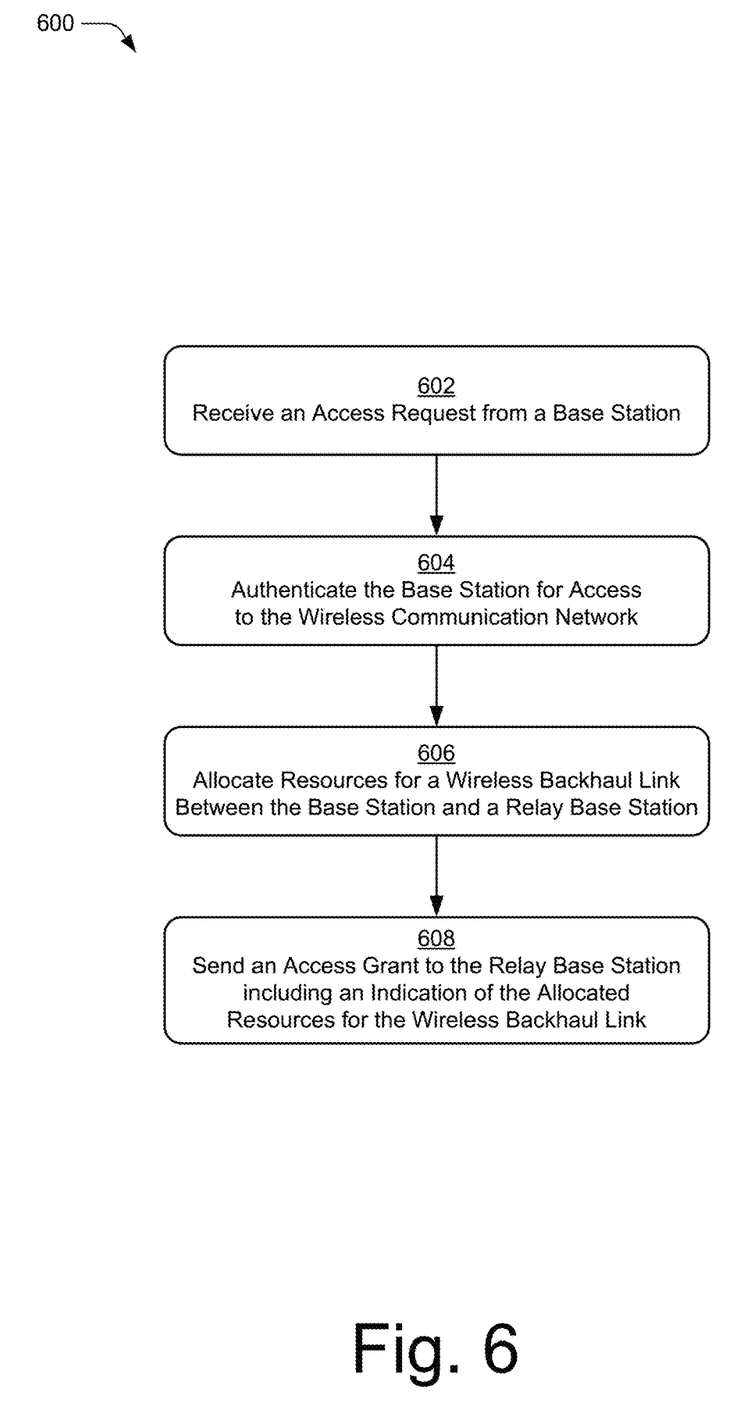
FIG. 6 illustrates an example method of fifth generation new radio backhaul and access as generally related to establishing a wireless backhaul link in accordance with aspects of the techniques described herein.

FIG. 6 illustrates example method(s) 600 of fifth generation new radio backhaul and access as generally related to establishing a wireless backhaul link. The order in which the method blocks are described are not intended to be construed as a limitation, and any number of the described method blocks can be skipped or combined in any order to implement a method or an alternate method.

At block 602, an Integrated Backhaul-Access and Mobility Function server receives an authorization request from a base station for authorization to access a wireless communication network. For example, the IB-AMF 216 server receives an access request from the base station 104 to request access to the RAN 112.

At block 604, the Integrated Backhaul-Access and Mobility Function server authenticates the base station. For example, the IB-AMF 216 server authenticates the base station 104 to determine that the the base station 104 is authorized to access to the RAN 112.

At block 606, the Integrated Backhaul-Access and Mobility Function server allocates resources for a wireless backhaul link between the base station and a relay base station. For example, the IB-AMF 216 server allocates air interface resources for a wireless backhaul link between the base station 104 and the relay base station 202a.

At block 608, the Integrated Backhaul-Access and Mobility Function server sends an access grant to the relay base station. For example, the IB-AMF 216 server sends an access grant message to the relay base station 202a, which is effective to cause the relay base station to transmit the access grant to the base station 104, and establish the wireless backhaul link between the base station 104 and the relay base station 202a.

Figure 7:
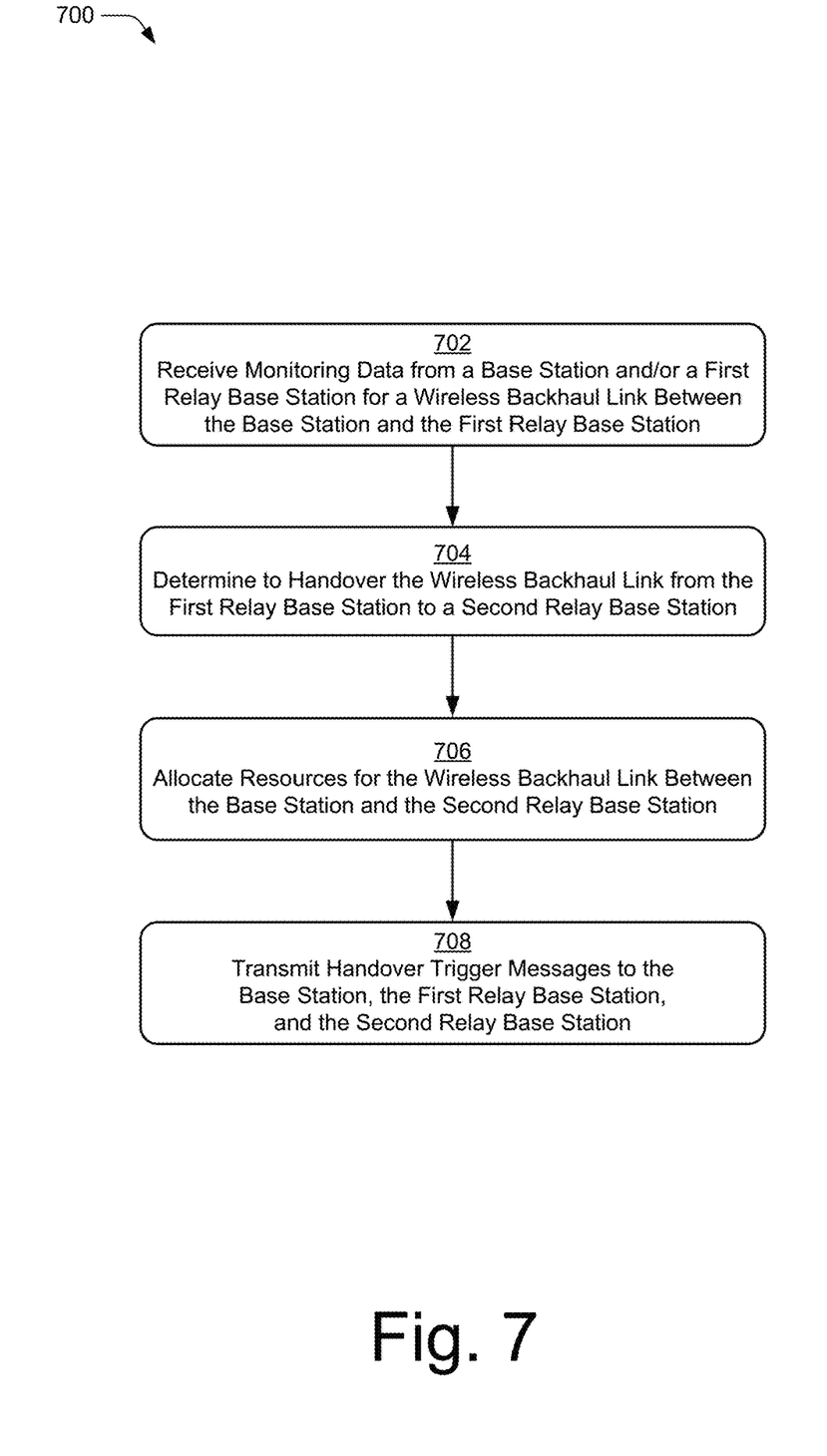
FIG. 7 illustrates an example method of fifth generation new radio backhaul and access as generally related handover management of a wireless backhaul link in accordance with aspects of the techniques described herein.

FIG. 7 illustrates example method(s) 700 of fifth generation new radio backhaul and access as generally related handover management of a wireless backhaul link. The order in which the method blocks are described are not intended to be construed as a limitation, and any number of the described method blocks can be skipped or combined in any order to implement a method, or an alternate method.

At block 702, an Integrated Backhaul Access and Mobility Function (IB-AMF) server receives monitoring data from a base station and/or a first relay base station for a wireless backhaul link between the base station and the first relay base station. For example, the IB-AMF 216 receives monitoring data from the base station 104, the relay base station 202a, or both for a wireless backhaul link between the base station 104 and the relay base station 202a.

At block 704, based at least in part on the received monitoring data, the IB-AMF server determines to handover the wireless backhaul link from the first relay base station to a second relay base station. For example, using the received monitoring data, the IB-AMF 216 determines to handover the wireless backhaul link from the relay base station 202a to the relay base station 202b.

At block 706, the IB-AMF server allocates resources for the wireless backhaul link between the base station and the second relay base station. For example, the IB-AMF 216 server allocates resources for the wireless backhaul link between the base station 104 and the relay base station 202b.

At block 708, the IB-AMF server transmits handover trigger messages to the base station, the first relay base station, and the second relay base station, the transmission being effective to cause the handover of the wireless backhaul link from the first relay base station to the second relay base station. For example, the IB-AMF 216 server transmits handover trigger messages to the base station 104, the relay base station 202a, and the relay base station 202b, the transmission being effective to cause the handover of the wireless backhaul link from the relay base station 202a to the relay base station 202b.

Although aspects of fifth generation new radio backhaul and access have been described in language specific to features and/or methods, the subject of the appended claims is not necessarily limited to the specific features or methods described. Rather, the specific features and methods are disclosed as example implementations of fifth generation new radio backhaul and access, and other equivalent features and methods are intended to be within the scope of the appended claims. Further, various different aspects are described, and it is to be appreciated that each described aspect can be implemented independently or in connection with one or more other described aspects.

What is claimed is:

1. A system comprising:
multiple relay base stations;
a base station configured to backhaul user-plane and control-plane communications of a wireless communications network via one or more of the multiple relay base stations; and
an Integrated Backhaul Access and Mobility Function (IB-AMF) server connected to the multiple relay base stations and configured to:
receive monitoring data from the base station, a first relay base station, or both for a wireless backhaul link between the base station and the first relay base station;
based at least in part on the received monitoring data, determine to handover the wireless backhaul link from the first relay base station to a second relay base station;
allocate resources for the wireless backhaul link between the base station and the second relay base station; and
transmit handover trigger messages to the base station, the first relay base station, and the second relay base station, the transmission being effective to cause the handover of the wireless backhaul link from the first relay base station to the second relay base station.

2. The system of claim 1, the Integrated Backhaul Access and Mobility (IB-AMF) server further configured to:
receive an access request for access to the wireless communications network from the base station;

authenticate the base station for access to the wireless communication network;

allocate resources for the wireless backhaul link between the base station and the first relay base station; and send an access grant to the first relay base station, the access grant including an indication of the allocated resources for the wireless backhaul link, which is effective to cause the first relay base station to forward the access grant to the base station and establish the wireless backhaul link.

3. The system of claim 2, comprising an additional base station, the Integrated Backhaul Access and Mobility (IB-AMF) server further configured to:

receive, via the base station, another access request for access to the wireless communications network from the additional base station;

authenticate the additional base station for access to the wireless communication network;

allocate resources for an additional wireless backhaul link between the additional base station and the base station; and send another access grant to the base station, the other access grant including an indication of the allocated resources for the additional wireless backhaul link, which is effective to cause the base station to forward the access grant to the additional base station and establish the additional wireless backhaul link.

4. The system of claim 3, wherein the sending the other access grant is effective to establish a multi-hop wireless backhaul link between the additional base station and the first relay base station, via the base station.

5. The system of claim 1, wherein the monitoring data includes one or more of: radio measurements of a quality of the wireless backhaul link, radio measurements of an environment around the base station, the first relay base station, or the second relay base station, a traffic load on the wireless backhaul link, a data throughput of the wireless backhaul link, a data retransmission rate over the wireless backhaul link, or a number of user devices connected to the wireless communication network through the base station, the first relay base station, or the second relay base station.

6. The system of claim 1, wherein the wireless backhaul link is configured to operate in one of: a sub-gigahertz radio band, a sub-6 GHz radio band, or an above 6 GHz radio band, and wherein the wireless backhaul link is configured for Time Division Duplex (TDD) communication, Frequency Division Duplex (FDD) communication, or both.

7. A method for managing wireless backhaul links in a wireless communications network by an Integrated Backhaul Access and Mobility Function (IB-AMF) server, the method comprising the IB-AMF server:

receiving monitoring data from a base station, a first relay base station, or both for a wireless backhaul link between the base station and the first relay base station;

based at least in part on the received monitoring data, determining to handover the wireless backhaul link from the first relay base station to a second relay base station;

allocating resources for the wireless backhaul link between the base station and the second relay base station; and transmitting handover trigger messages to the base station, the first relay base station, and the second relay base station, the transmitting being effective to cause the handover of the wireless backhaul link from the first relay base station to the second relay base station.

8. The method of claim 7, the method further comprising the IB-AMF server:

receiving an access request for access to the wireless communications network from the base station;

authenticating the base station for access to the wireless communication network;

allocating resources for the wireless backhaul link between the base station and the first relay base station; and sending an access grant to the first relay base station, the access grant including an indication of the allocated resources for the wireless backhaul link, which is effective to cause the first relay base station to forward the access grant to the base station and establish the wireless backhaul link.

9. The method of claim 8, the method further comprising the IB-AMF server:

receiving, via the base station, another access request for access to the wireless communications network from an additional base station;

authenticating the additional base station for access to the wireless communication network;

allocating resources for an additional wireless backhaul link between the additional base station and the base station; and sending another access grant to the base station, the other access grant including an indication of the allocated resources for the additional wireless backhaul link, which is effective to cause the base station to forward the access grant to the additional base station and establish the additional wireless backhaul link.

10. The method of claim 9, wherein the sending the other access grant is effective to establish a multi-hop wireless backhaul link between the additional base station and the first relay base station, via the base station.

11. The method of claim 7, wherein the monitoring data includes radio measurements of a quality of the wireless backhaul link.

12. The method of claim 7, wherein the monitoring data includes one or more of: radio measurements of a quality of the wireless backhaul link, radio measurements of an environment around the base station, the first relay base station, or the second relay base station, a traffic load on the wireless backhaul link, a data throughput of the wireless backhaul link, a data retransmission rate over the wireless backhaul link, or a number of user devices connected to the wireless communication network through the base station, the first relay base station, or the second relay base station.

13. The method of claim 7, wherein the wireless backhaul link is configured for Time Division Duplex (TDD) communication, Frequency Division Duplex (FDD) communication, or both.

14. The method of claim 7, wherein the base station is configured to backhaul user-plane and control-plane communications of a wireless communications network via one or more of multiple relay base stations.

15. An Integrated Backhaul-Access and Mobility server device comprising:

one or more processors; and a memory comprising instructions for an Integrated Backhaul Access and Mobility Function application, the instructions executable by the one or more processors to configure the one or more processors to:

receive monitoring data from a base station, a first relay base station, or both for a wireless backhaul link between the base station and the first relay base station;

based at least in part on the received monitoring data, determine to handover the wireless backhaul link from the first relay base station to a second relay base station;

allocate resources for the wireless backhaul link between the base station and the second relay base station; and transmit handover trigger messages to the base station, the first relay base station, and the second relay base station, the transmitting being effective to cause the handover of the wireless backhaul link from the first relay base station to the second relay base station.

16. The Integrated Backhaul-Access and Mobility server device of claim 15, the instructions further executable by the one or more processors to configure the one or more processors to:

receive an access request for access to a wireless communications network from the base station;

authenticate the base station for access to the wireless communication network;

allocate resources for the wireless backhaul link between the base station and the first relay base station; and send an access grant to the first relay base station, the access grant including an indication of the allocated resources for the wireless backhaul link, which is effective to cause the first relay base station to forward the access grant to the base station and establish the wireless backhaul link.

17. The Integrated Backhaul-Access and Mobility server device of claim 16, the instructions further executable by the one or more processors to configure the one or more processors to:

receive, via the base station, another access request for access to the wireless communications network from an additional base station;

authenticate the additional base station for access to the wireless communication network;

allocate resources for an additional wireless backhaul link between the additional base station and the base station; and send another access grant to the base station, the other access grant including an indication of the allocated resources for the additional wireless backhaul link, which is effective to cause the base station to forward the access grant to the additional base station and establish the additional wireless backhaul link.

18. The Integrated Backhaul-Access and Mobility server device of claim 17, wherein the sending the other access grant is effective to establish a multi-hop wireless backhaul link between the additional base station and the first relay base station, via the base station.

19. The Integrated Backhaul-Access and Mobility server device of claim 15, wherein the monitoring data includes radio measurements of a quality of the wireless backhaul link.

20. The Integrated Backhaul-Access and Mobility server device of claim 15, wherein the monitoring data includes one or more of: radio measurements of a quality of the wireless backhaul link, radio measurements of an environment around the base station, the first relay base station, or the second relay base station, a traffic load on the wireless backhaul link, a data throughput of the wireless backhaul link, a data retransmission rate over the wireless backhaul link, or a number of user devices connected to a wireless communication network through the base station, the first relay base station, or the second relay base station.

* * * * *